United States Patent [19]
Orr et al.

[11] Patent Number: 5,612,081
[45] Date of Patent: Mar. 18, 1997

[54] APPLYING GRIT PARTICLES TO A CONTINUOUS WEB

[75] Inventors: Brian Orr; Nigel E. Wrigley, both of Lancashire, United Kingdom

[73] Assignee: Netlon Limited, Blackburn, United Kingdom

[21] Appl. No.: 589,701

[22] Filed: Jan. 22, 1996

Related U.S. Application Data

[63] Continuation-in-part of Ser. No. 380,751, Jan. 31, 1995, abandoned.

[30] Foreign Application Priority Data

Nov. 25, 1994 [GB] United Kingdom .................. 9423853
Nov. 24, 1995 [GB] United Kingdom .................. 9524097

[51] Int. Cl.$^6$ ............................. B05D 1/12; B05D 1/28; B05C 11/02; B05C 1/08
[52] U.S. Cl. ............................. 427/8; 427/180; 427/202; 427/428; 427/359; 118/117; 118/263; 118/693; 428/143
[58] Field of Search .............................. 427/8, 180, 201, 427/202, 359, 428; 428/143; 118/117, 258, 263, 322, 602, 641, 667, 693

[56] References Cited

U.S. PATENT DOCUMENTS

| | | | |
|---|---|---|---|
| 2,748,019 | 5/1956 | Schramm, Jr. ........................ | 427/301 |
| 2,899,288 | 8/1959 | Barclay ................................ | 51/293 |
| 3,230,672 | 1/1966 | Anthon ................................. | 51/404 |
| 3,314,293 | 4/1967 | Schraeder ............................ | 73/355 |
| 3,813,231 | 5/1974 | Gilbert et al. ....................... | 51/298 |
| 4,041,197 | 8/1977 | Gagne ................................. | 427/278 |
| 4,264,644 | 4/1981 | Schaetti .............................. | 427/55 |
| 4,407,867 | 10/1983 | Bruck et al. ....................... | 427/365 |

FOREIGN PATENT DOCUMENTS

| | | |
|---|---|---|
| 0237784 | 9/1987 | European Pat. Off. . |
| 0508950 | 10/1991 | European Pat. Off. . |
| 508950 | 10/1991 | European Pat. Off. . |
| 0449182 | 10/1991 | European Pat. Off. . |
| 2695669 | 3/1994 | France . |
| 1479397 | 11/1970 | Germany . |
| 3810300 | 10/1989 | Germany . |
| 55-137933 | 1/1981 | Japan . |
| 1299026 | 1/1981 | Japan . |
| 4179545A | 6/1992 | Japan . |
| 4135838 | 8/1992 | Japan . |
| 4135839 | 9/1992 | Japan . |
| 058360A | 5/1993 | Japan . |
| 5124157A | 9/1993 | Japan . |
| 1569943 | 6/1980 | United Kingdom . |
| 2190607 | 11/1987 | United Kingdom . |
| 2255292 | 11/1992 | United Kingdom . |
| 9114511 | 10/1991 | WIPO . |

OTHER PUBLICATIONS

J.M.N. Engineering Leaflet "Polymer Coating Technology". No Date.
J.M.N. Engineering Leaflet "Special Purpose Machinery". No Date.

*Primary Examiner*—Shrive Beck
*Assistant Examiner*—Fred J. Parker
*Attorney, Agent, or Firm*—Jacobson, Price, Holman & Stern, PLLC

[57] ABSTRACT

To apply hot grit particles to a continuous thermoplastic web such as a geonet, the web is brought to the upper part of the surface of a roller which is rotating in a container containing grit particles. A controlled layer of grit particles is carried up over the upper part of the roller, and the particles are heated by halogen emitters and are pressed into the web, causing local melting of the web so that the grit particles are embedded and firmly retained. Grit particles are added to a hopper and the top surface of the mass of grit particles adjacent the ascending part of the roller surface is kept at a controlled level below the uppermost part of the roller. Surplus grit particles not taken up by the web are recirculated by interaction with the roller surface.

38 Claims, 5 Drawing Sheets

APPLYING GRIT PARTICLES TO A CONTINUOUS WEB

This application is a continuation-in-part of application Ser. No. 08/380,751, filed Jan. 31, 1995, now abandoned for Applying Grit Particles to a Continuous Web, the subject matter of which is incorporated herein by reference.

BACKGROUND OF THE INVENTION

The present invention relates to a method of, and apparatus for, continuously applying grit particles to a continuous web. A roller is provided which is rotating about a substantially horizontal axis, and a (thin) layer of grit particles is provided on the upper part of the roller peripheral surface. The web is guided in a path which brings it into a receiving zone for receiving grit particles which have been carried up onto the upper part of the roller peripheral surface, to thereby grit the web. Such a method and apparatus are disclosed in FIGS. 8 to 10 of US Application Ser. No. 08/380,752, filed Jan. 31, 1995, for Waste Containment Landfill Enclosure and Components therefor, the subject matter of which is incorporated herein by reference (and to which corresponds GB 2 255 292A). By "continuous" is meant continuous in the normal manufacturing sense, although the webs normally have a finite length and the apparatus is not running all the time.

The apparatus shown in FIGS. 8 to 10 of GB 2 255 292A is relatively complex and expensive, and special care must be taken in order to control the even distribution of the grit particles on the upper part of the roller peripheral surface, which makes it difficult to increase the width of the machine in order to grit wider webs. The practical maximum width of this type of distribution mechanism was very roughly two meters; for product widths greater than this a plurality of such mechanisms would be required. A doctor blade is used to provide the final control of the grit particle distribution. A particular problem with a doctor blade is that a small amount of maladjustment causes a relatively large difference in the thickness of the grit particle layer, exacerbated in this case because the grit particles will cause fairly rapid wear of the blade. Wear of 0.01 or 0.1 mm can be significant. Such a problem exists with any arrangement for controlling the grit particle distribution by passing the grit particles through a predetermined gap of a width equal to the required thickness of grit particles on the web.

It is desirable to simplify the apparatus and make it less expensive. It is desirable to simplify the control of the distribution of the grit particles.

THE INVENTION

According to the invention, the roller rotates with at least a portion of the ascending part of its peripheral surface in a container containing the grit particles, and carries the grit particles up onto the upper part of the roller peripheral surface. Grit particles can be added to the container as grit particles are received by the web (the grit particles will be secured or adhered to the web) whilst maintaining the top surface of the mass of grit particles adjacent the ascending part of the roller peripheral surface at a controlled level below the uppermost part of the roller.

The apparatus of the invention is very simple, and permits increase in the width of the web without impairing the distribution of the grit particles. With the present invention, there is no difficulty in designing and making a machine for gritting a web having a width of 6 or 7 meters. The apparatus is self-regulating and a uniform grit particle layer is provided by friction and quasi fluid dynamics. Apart from keeping the container supplied with the appropriate amount of grit, no further control appears to be necessary. There are very few working parts, and thus maintenance is simple. There is no need for special distribution arrangements for the grit particles and no need for mechanical implements such as doctor blades.

The thickness of the layer of grit particles carried up onto the upper part of the roller is directly controlled by the level of grit particles adjacent the ascending part of the roller peripheral surface. Provided the level of the surface of the mass of grit particles on the ascending side of the roller is sufficiently high, and provided there is sufficient friction or engagement between the roller peripheral surface and the grit particles for the transport (and recirculation if required) of the grit particles, the roller peripheral surface can be smooth or not smooth though it is believed that a polished roller would be inappropriate; preferably there is a positively controlled roughness, achieved by for instance shot-blasting, machining a pattern or grooving or knurling. The roller peripheral surface can be provided with grooves extending parallel to the roller axis, which can be formed by knurling. The optimum groove depth and width is related to the maximum grit particle size, and should be of sufficient size to contain and transport (and recirculate if required) the grit particles efficiently. One successful embodiment has been found to be where each groove is large enough to hold at least one grit particle as viewed in cross-section in such a way that no more than half of the grit particle projects beyond a circle at the radius of the crests separating the grooves and the width of each groove is large enough to enable at least parts of at least two grit particles to engage in the groove, as viewed in cross-section. It is found that if such grooves are provided, grit particles in the grooves pick up a further layer of grit particles which are above the crest of the grooves and are carried up to the upper part of the roller peripheral surface.

The thickness of the layer above the crests of the grooves, or of the layer on a smooth roller, seems to be determined by the pick-up slope of the grit on the ascending or feed side of the roller. As the roller peripheral surface rises, grit can be seen falling back until the roller peripheral surface reaches a pick-up point, after which there is no significant fall-back of grit particles and the thickness of the grit layer remains the same; the relevant roller peripheral surface upper part begins at the pick-up point, which is below the uppermost part of the roller peripheral surface. It is believed that as long as the tangent to the pick-up point intercepts the surface of the mass of grit particles in the container, proper pick-up can be maintained. This is best done by placing a control member in the container adjacent the ascending part of the roller peripheral surface but at a distance from the roller peripheral surface significantly greater than the thickness required for the controlled layer of grit particles (and even a large multiple of the latter thickness) and positioned such that its lower edge is below said tangent. However, it is not essential to provide such a member. If the control member is present, the falling-back grit particles form a small heap between this control member and the ascending part of the roller peripheral surface. Though the control member may be adjustable, it is found that within reasonable limits, differences in the level of the grit particles in the container as a whole do not make any difference to the thickness of the layer of grit particles being carried up over the top of the roller, provided this control member is fitted and controls the level immediately adjacent the ascending part of the roller peripheral surface.

Compared to a doctor blade, the control member is a large distance from the roller peripheral surface, ie the gap is much greater than the required thickness of grit particles on the web. The control member is not expected to wear significantly, but if it does, the wear would have no appreciable effect on the distribution of the grit particles in the receiving zone as the control member does not directly control the thickness of the grit particle layer, though it does control the position of the pick-up point; however, as an example, an angular difference in the pick-up point of one degree would make very little difference to the layer thickness but would represent a distance of 5 mm on the peripheral surface of a roller of 575 mm diameter. Thus accurate control can be provided and maintained.

If the gritting is being carried out continuously, grit particles must be added to the container as grit particles are removed from the container. Particularly when gritting a mesh structure web, surplus grit particles not removed by the web may be recirculated to adjacent the ascending part of the roller peripheral surface; preferably they are recirculated under the roller, within said container, at least in part by interaction with the roller peripheral surface, though any suitable form of recirculation can be employed, even if only collecting surplus grit particles in a bag below the apparatus and putting the grit particles back into the container. If the web is imperforate, the apparatus could be adjusted to give no significant surplus of grit particles and hence no need for recirculation.

In the preferred embodiment, where there is recirculation under the roller, within the container, it is believed that there is a laminar movement of grit around the lower peripheral surface of the roller, driven by the peripheral surface of the roller, equal to the amount falling from the roller, this amount being made up to the total amount of grit being carried up over the top of the roller by automatically picking up grit particles from the container. This recirculation could be assisted by additional means.

The receiving zone can be in any convenient location after said pick-up point (the point on the roller peripheral surface upper part after which there is no significant fall-back of grit particles). In one arrangement, the receiving zone is at the roller peripheral surface upper part eg in the upper quadrant of the descending part of the roller peripheral surface. In another arrangement, the receiving zone is beneath the descending part of the roller peripheral surface so that the grit particles fall off the roller peripheral surface and onto the web; this arrangement is particularly suitable if the grit particles are not heated. In said arrangement, provided that the roller has a suitable, uniform roughness, the speed of the roller is not relevant within a reasonable range; the roughness can be as described above, though if grooving is used, it must be sufficiently fine to avoid depositing the grit particles in lines across the web (unless this effect is desired).

If the receiving zone is at the roller peripheral surface upper part, only the thin upper layer of the grit particles need be picked up by (indented into or adhered to) the surface of the web. If the web is a mesh structure (net or grid), only the outer surfaces of the strands on one face pick up the grit; as the strands may provide only 10 to 15% of the surface area, very little of the grit from the peripheral surface of the roller is taken up by the web; it is believed that only about 3% of the grit particles being carried up over the roller peripheral surface are taken up by the web. If the web is imperforate, this percentage will be higher and, at least in theory, the percentage could be substantially 100% with an appropriate roller surface. However in a preferred embodiment the remaining grit particles fall from the roller onto a drop-off pile and are recirculated to the ascending part of the roller peripheral surface, the drop-off pile remaining substantially constant in size.

In general, in or just downstream of the receiving zone the web can pass through a gap one side of which is formed by a roller which engages the grit particles, and which can be the roller rotating in the container. The gap through which the web passes must be adjusted in accordance with the thickness of the web, but once adjusted can be left fixed. If the grit particles are not to be pressed fully into the web but project from the web, the gap should be slightly greater than the thickness of the web or approximately equal to the thickness of the web, thereby avoiding any squeeze down.

The grit particles can be secured or adhered to the web in any suitable way, eg by heating the web and/or the grit particles or by applying adhesive to the web and using heated or unheated grit particles (heating the grit particles can at least assist in setting or drying the adhesive). In a preferred mode, the web or at least its surface is thermoplastic and the grit particles are heated (e.g. by radiant heaters or by flame heating) to a temperature such that in the contact zone, the heated grit particles cause local softening or melting of the web surface and are on cooling embedded in and firmly retained by the web. The grit particles must be heated to a sufficiently high temperature to have enough thermal energy to supply any latent heat of softening or melting of the thermoplastic while still remaining above the softening or melt temperature of the thermoplastic. The thermoplastic can be any suitable thermoplastic, such as high density polyethylene (HDPE) or polypropylene (PP). Due to the self-regulation, such temperature distortion as occurs in the feed control member or in the container or on the roller has very little effect on the amount of grit particles picked up by the web.

If the grit particles are heated and the receiving zone is at the roller peripheral surface upper part, the temperature of the grit particles can be sensed using temperature sensing means such as a thermocouple downstream of the contact zone and adjacent the descending part of the roller surface, preferably below the level of the roller axis, so that the sensing means are in the path of and engaged by the falling grit particles. By sensing the temperature at this point, the heating means output can be controlled appropriately.

In the preferred embodiment, the web is at or close to ambient temperature to minimise the amount of material that softens or melts to flow around the grit and to ensure that this softened or molten material cools and sets as quickly as possible after the grit has been enrobed. However, for reasons, for example, of speeding up manufacturing rates, it may be advantageous to warm the web at machine entry, though, if this is done, it may then also be desirable to cool the web, e.g. by forced draught, after the grit has been applied. It is preferred that the surface of the web does not reach the softening or melting temperature before engaging the grit particles.

The grit particles can be heated while on the upper part of the roller peripheral surface, before they reach the receiving zone, i.e. while they are in a thin layer. This means that start-up can be very rapid as very little time is required in order to heat up the grit particles being carried into the receiving zone. Preferably, the heating zone terminates as close as practicable to the receiving zone. If the roller is smooth, the pick-up point is higher so that there is less time for heating the grit particles as they pass over the top of the roller.

The web can be an imperforate membrane such as a geomembrane, or can be a net such as a drainage net or geonet, or can be a more robust mesh structure such as a geogrid. Specific examples of geomembrane, geonets and geogrids are given in GB 2 255 292A. In another alternative, the web could be a fabric with either an adhesive or a thermoplastic coating on the face contacting the grit, for the manufacture of gritted paper or fabric, for instance sandpaper or emery cloth.

A large range of grit sizes can be used, e.g. down to about 200 microns maximum dimension for emery cloth, though for geo use a preferred size is about 700 microns maximum dimension. The types of grit can be as in GB 2 255 292 A, page 6, line 15 to page 7, line 1.

BRIEF DESCRIPTION OF THE DRAWINGS

The invention will be further described, by way of example, with reference to the accompanying drawings, in which.

PREFERRED EMBODIMENTS

Figure 1:
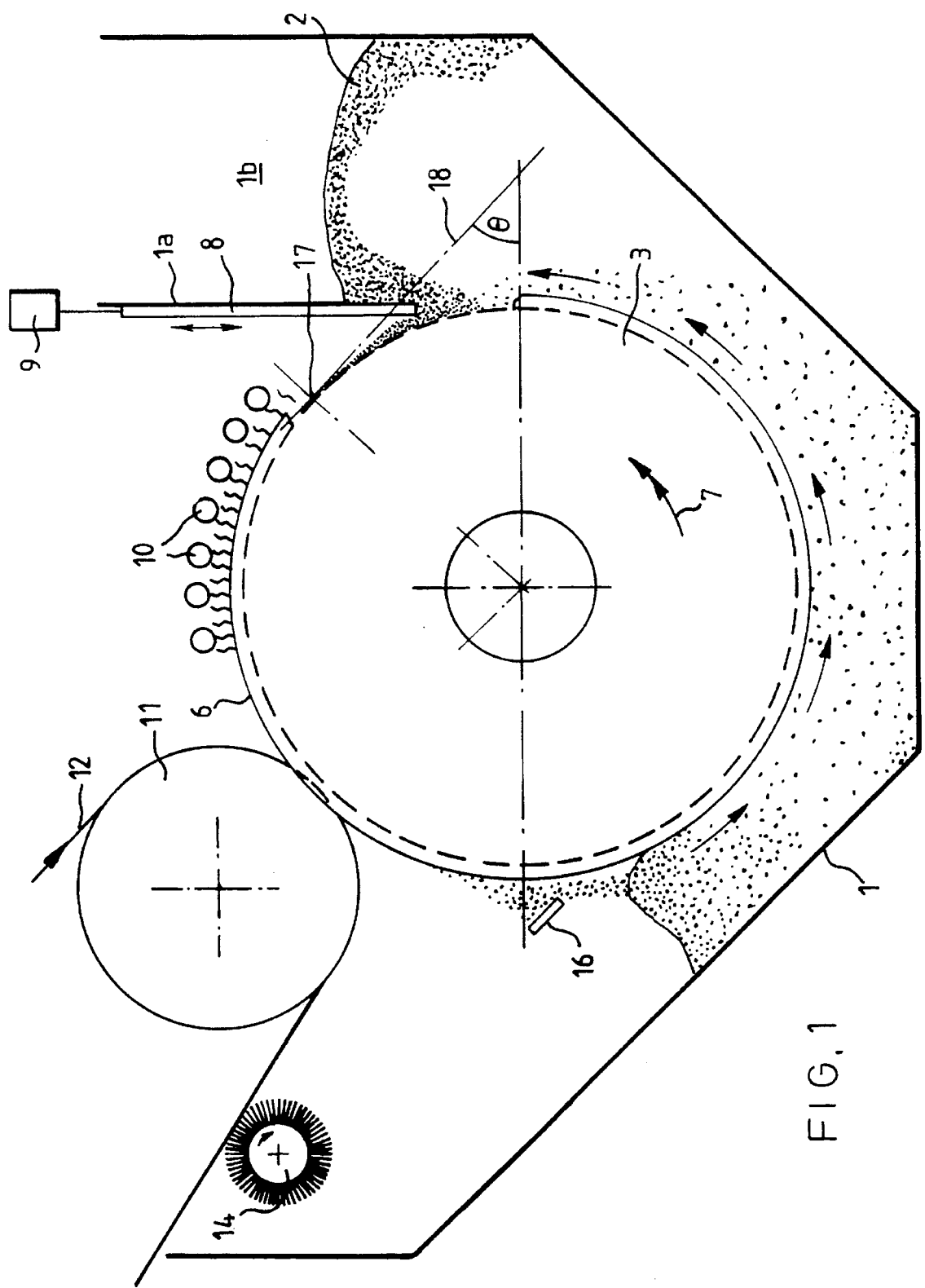
FIG. 1 is a vertical section through a first gritting machine in accordance with the invention, along the line I—I in FIG. 2.
Figure 2:
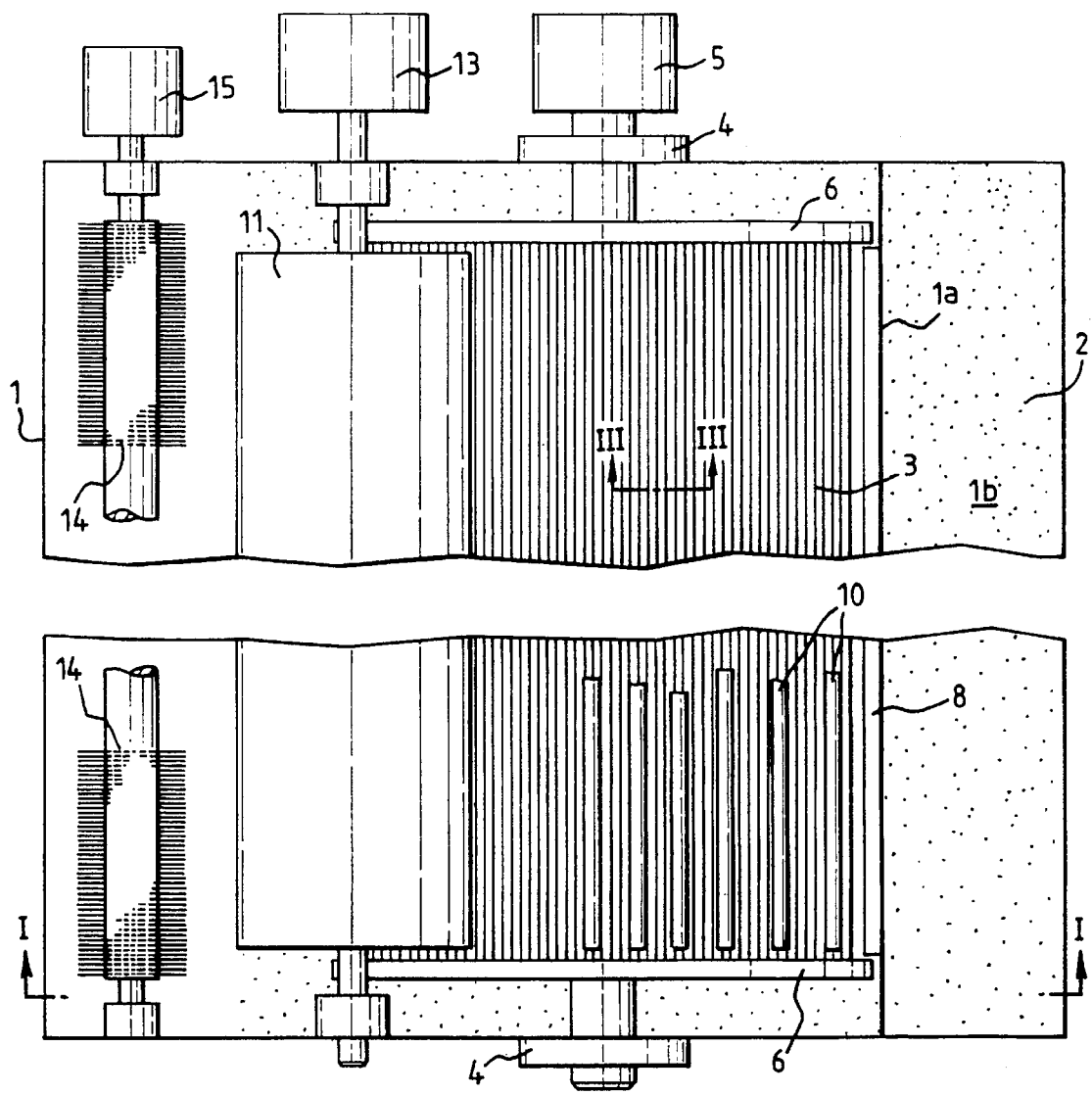
FIG. 2 is a schematic plan view of the gritting machine of FIG. 1.
Figure 3:
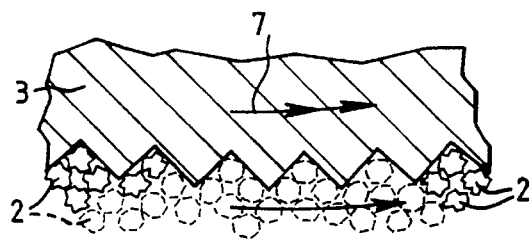
FIG. 3 is a detail, taken in vertical section along the line III—III of FIG. 2, showing the knurling on the roller.

FIGS. 1 to 3

The machine has a container 1 (which includes a crosswall 1a defining a hopper 1b) containing grit particles 2. A roller 3 or drum is mounted for rotation about a horizontal axis by means of bearings 4 which are protected from the grit particles 2, and rotating means or a drive 5 is indicated schematically. The peripheral surface of the roller 3 is knurled so as to have grooves extending parallel to the axis (see FIG. 3). The roller 3 has smooth flanges 6 (the near flange 6 is shown partly cut-away in FIG. 1) to minimise fall-off from the sides of the roller, and to ensure a more constant thickness of the grit particles 2 up to the edges of the roller 3. If the level of the mass of grit particles 2 on the ascending side of the roller 3 is suitably chosen (and not too high), the pick-up by the flanges 6 is minimal. The direction of rotation of the roller 3 is indicated by a double-headed arrow 7. A vertically-moveable control member or gate 8 is mounted in the container 1 adjacent the ascending side of the roller 3 and defines one side of the hopper 1b. The gate 8 is for adjusting the level of the surface of the mass of grit particles 2 adjacent the ascending part of the roller surface. Gate height adjustment means 9 are shown schematically in FIG. 1.

Over the upper part of the roller peripheral surface (as shown, over the uppermost 45° of the ascending part of the roller peripheral surface and also preferably beyond the centre line of the roller 3) there are heating means in the form of radiant heaters 10 (e.g. a bank of halogen infra-red emitters shown partially cut-away in FIG. 2), for heating the grit particles 2 on the upper part of the roller peripheral surface. A cover (not shown) is provided for the radiant heaters 10.

Adjacent the upper quadrant of the descending part of the roller peripheral surface, there is a guide roller 11 which guides a continuous thermoplastic web 12 (e.g. a geomembrane, geonet or geogrid) in a path which brings it into a receiving or contact zone over the part of the guide roller 11 which is nearest the main roller 3, where it contacts grit particles 2 on the main roller 3. The guide roller 11: a) may be an idle roller driven by the moving web 12 which is driven by another drive roller (not shown), or b) may be an idle roller, the moving web 12 being driven by the main roller 3, or c) can have a drive 13 indicated schematically in FIG. 2. The axis of the guide roller 11 can be moved to adjust the gap between the guide roller 11 and the roller 3. In the contact zone, the web 12 and the peripheral surface of the roller 3 are moving at substantially the same speed and in the same direction. The web 12 can have the same width as the guide roller 11 (which is slightly narrower than the main roller 3) or be narrower, as desired. A rotary brush 14 is provided for brushing off excess grit particles, a drive 15 being indicated schematically.

Temperature sensing means in the form of thermocouple 16 are placed downstream of the contact zone and below the level of the axis of the roller 3 so that they are in the path of falling grit particles 2 as they tend to fall off the surface of the roller 3. The stream of falling grit particles 2 impacts or contacts the thermocouple 16.

The container 1 is such that there is sufficient distance between the bottom of the roller 3 and the bottom of the container 1 to avoid any significant pressure against the roller 3 and consequent grinding of the surface of the roller 3.

The roller 3 carries or transports a layer of grit particles 2 up onto an upper part of the roller peripheral surface. FIG. 1 indicates the pick-up point 17 and the tangent 18 to this point 17, which is at an inclination of θ to the horizontal. The gate 8 is adjusted so that it is intercepted by the tangent 18.

The single-headed arrows indicate laminar flow of the grit particles 2 under and close to the roller 3, from the descending part of the roller 3 to the ascending part, providing recirculation of the grit particles 2.

Though not shown, a sprayer or a coating roller can be included after the rotary brush 14 for applying to the web 12 a thin retaining coating, e.g. having a thickness not greater than 0.1 mm, to hold in place any grit particles 2 which are not properly keyed in position, to avoid dislodging such particles during handling. The coating can be flexible varnish or latex. The sprayer or coating roller can be followed by suitable dryers (not shown).

EXAMPLE

Web 12: any of the webs specifically described in GB 2 255 292A.
Material of web 12: HDPE, melting at 135° to 140° C.
Gap between roller 11 and roller 3: equals thickness of web 12.
Diameter of roller 3: 508 min.
Material of roller 3: mild steel.
Diameter of roller 11: 254 min.
Material of roller 11: mild steel.
Speed of roller 3: such as to provide a surface velocity of 5 m/minute (equal to the speed of the web 12), which could be increased to 10 m/minute.

Width of roller 3: up to 3 m.
Depth of flanges 6: 12 min.
Grit size: all passes through 40 mesh to inch sieve (maximum dimension about 700 microns).
Knurling trough-to-crest: 1 min.
Knurling crest to crest distance: 1.625 min.
Knurling trough angle: 75°.
Pick-up point: 43° before top dead centre of roller 3.
Grit fall-off point: 47° after top dead centre of roller.
Angle θ: 43°.
Guide roller 11 position: axis is 45° from top dead centre of roller 3.
Radiant heaters 10: halogen infra-red emitters of heating capacity 25 kW per meter width of the roller 3 (for a web speed of 5 m/minute).
Pass time under the halogen infra-red emitters 10: 2.4 seconds.
Grit temperature in contact zone: 280°–300° C.
Grit temperature at thermocouple 16: 250° C.
Position of gate 8: the surface facing the roller 3 is on a plane which is spaced 12.5 mm from the nearest part of the roller surface.
Height of the bottom of the gate 8: 104 mm above the axis of the roller 3.

It is believed that for machines of greater width, the only dimensions given above that would need to be changed are the diameters of rollers 3 and 11.

Figure 4:
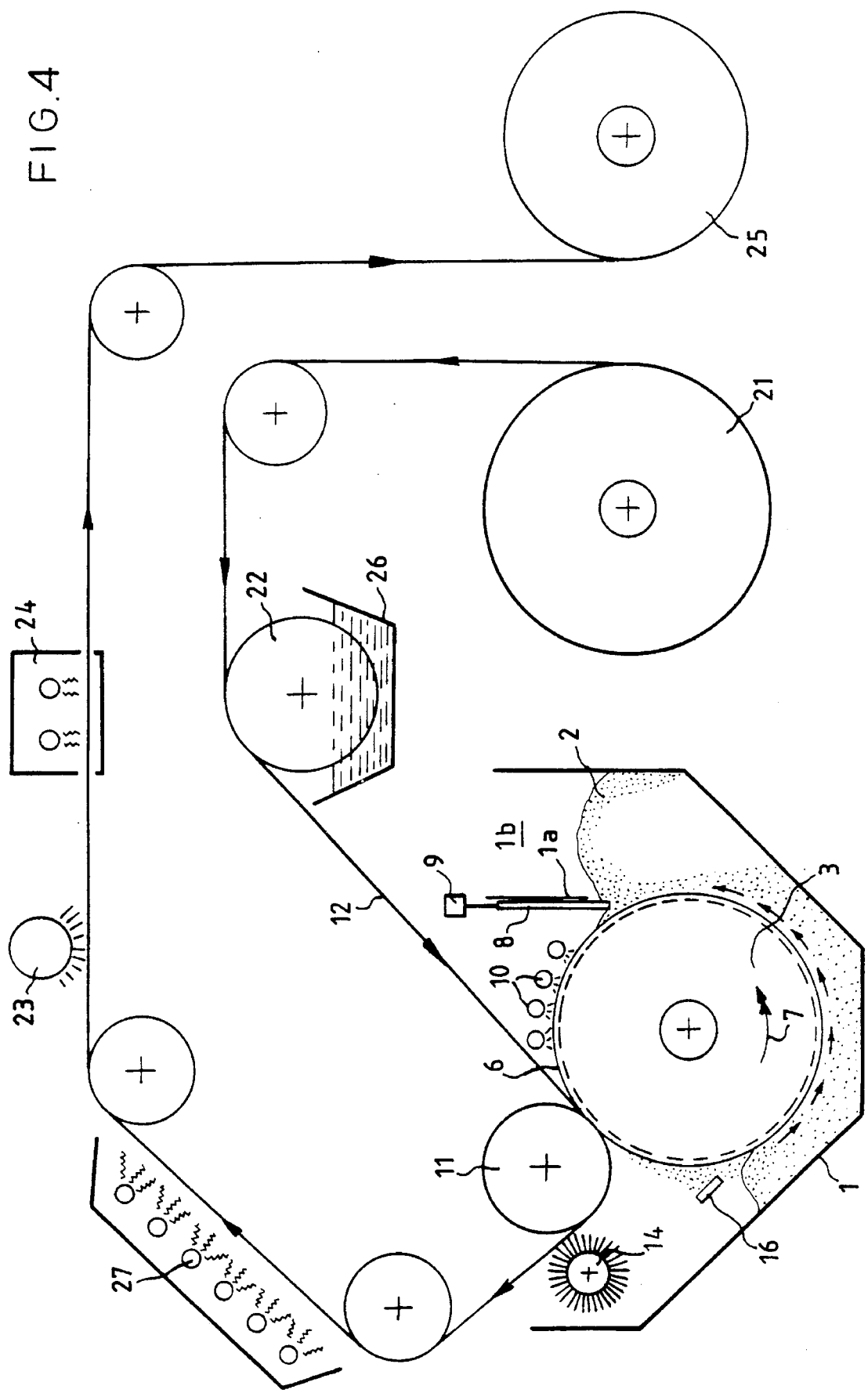
FIG. 4 is a vertical section, corresponding to that of FIG. 1, through a second gritting machine in accordance with the invention.
Figure 5:
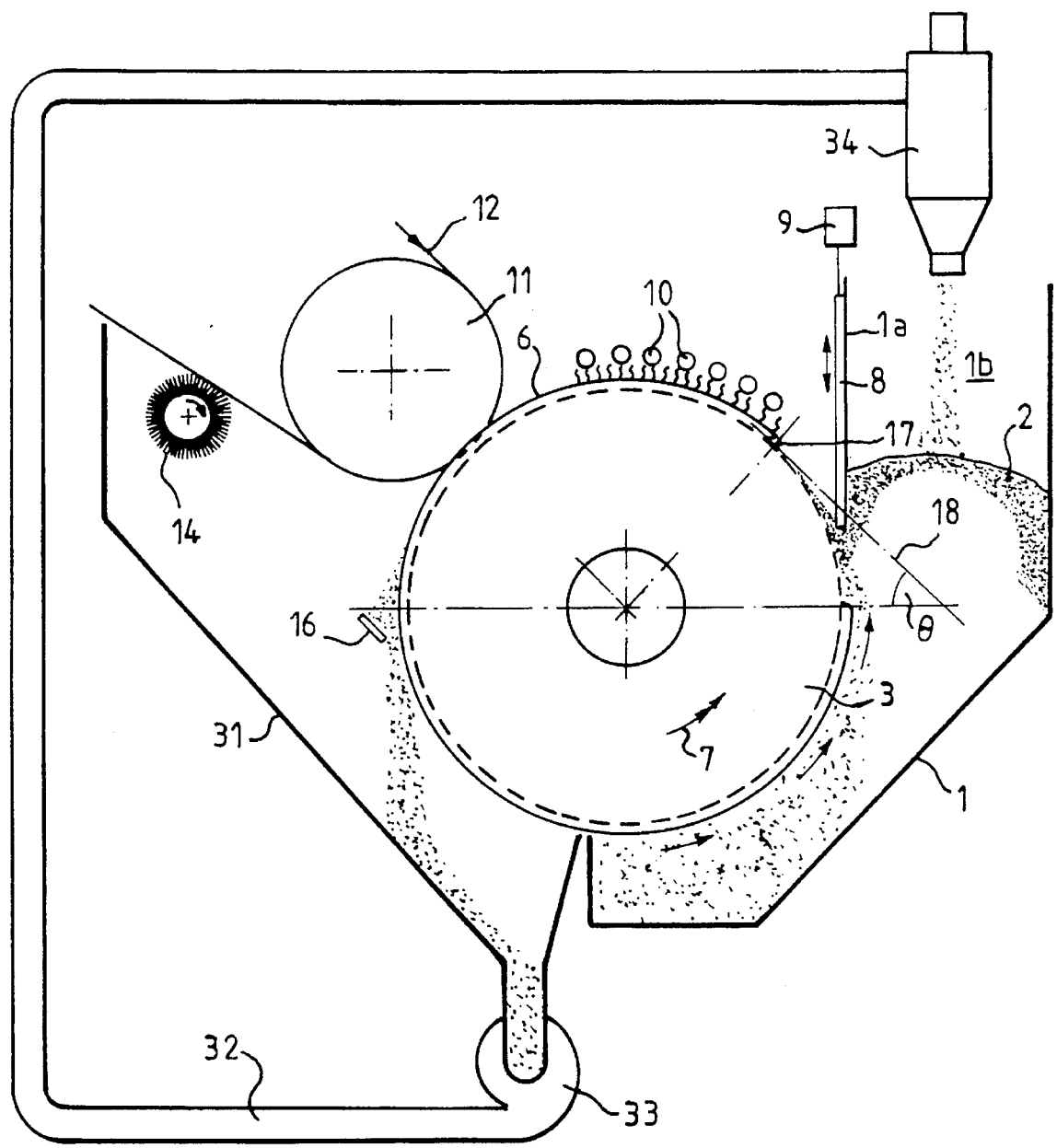
FIG. 5 is a vertical section, corresponding to that of FIG. 1, through a third gritting machine in accordance with the invention.
Figure 6:
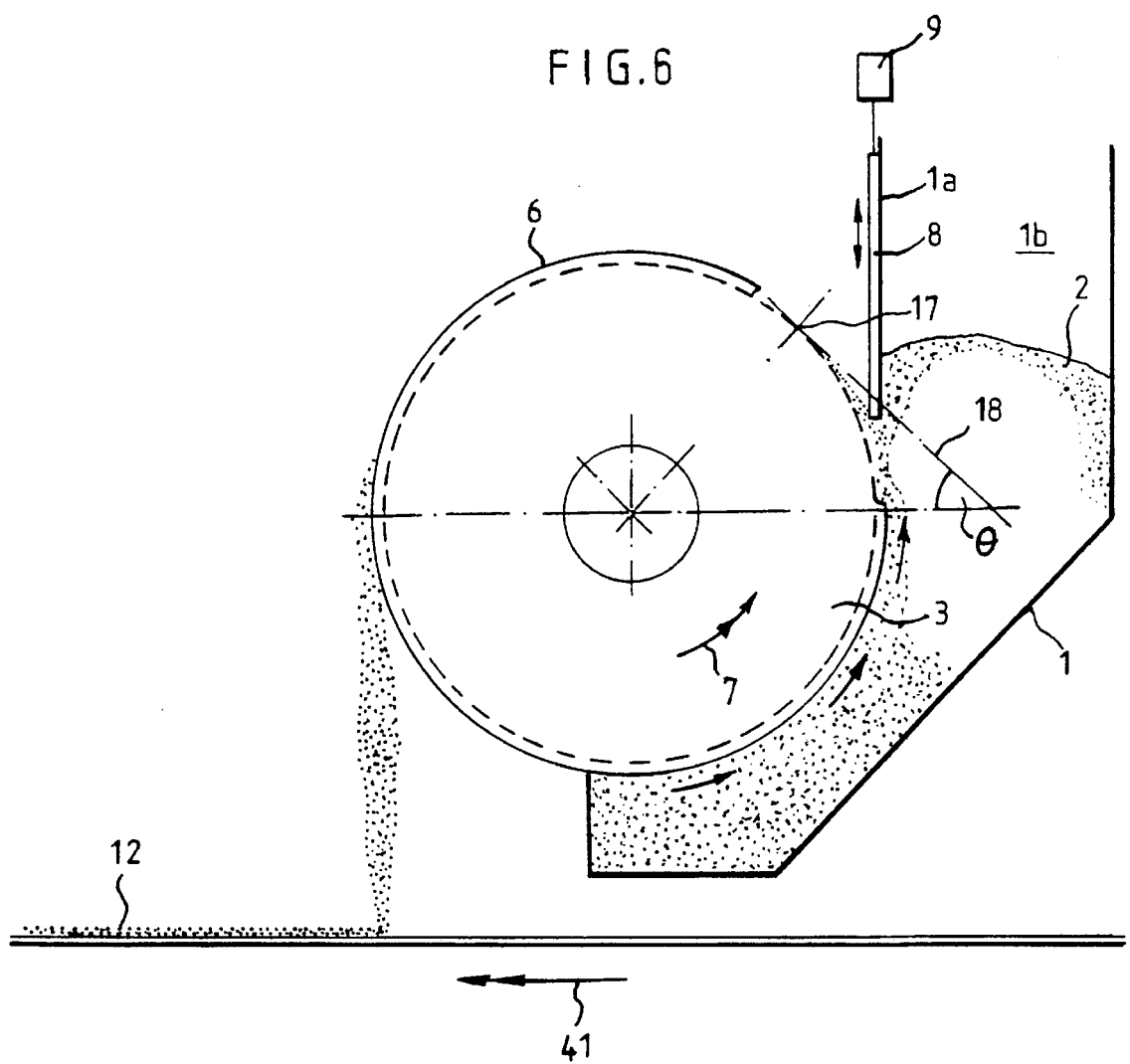
FIG. 6 is a vertical section, corresponding to that of FIG. 1, through a fourth gritting machine in accordance with the invention.

FIGS. 4, 5 and 6

In FIGS. 4, 5 and 6, references which are the same as those in FIGS. 1 to 3 indicate items which are the same or similar.

FIG. 4

The web 12 is taken off a let-off reel 21, over an applicator or coating roller 22, beneath a lacquer spray 23 and a lacquer setting heater 24, and to a take-up reel 25. The coating roller 22 dips into a bath 26 containing an adhesive such as an aqueous adhesive. If desired, the gritted web 12 can be heated by any suitable heaters 27 to provide good bonding of the grit 2 and can be dried using drying tunnels or fans (not shown).

Alternatively or in addition, it is possible to incorporate the heaters 10 shown in FIG. 1 (and the thermocouple 16 if desired) and use the hot grit particles 2 to assist in drying or setting the adhesive, reducing the need for, or eliminating, complex drying tunnels or fans.

FIG. 5

Only the ascending part of the peripheral surface of the roller 3 is in the container 1. There is a separate return hopper 31 on the descending side of the roller 3 with a positive recirculation device 32 for recirculating the unused portion of the layer of grit particles 2 to the ascending side of the roller 3, i.e. to the container 1, in the case illustrated specifically to the hopper 1b. The recirculation device 32 is illustrated schematically as comprising a fan 33 and a cyclone 34, but any suitable recirculation device can be used, for instance a screw conveyor or a bucket conveyor.

In FIG. 5, the hopper 31 could be divided from the container 1 by a single dividing wall taken up to the lower part of the peripheral surface of the roller 3.

FIG. 6

FIG. 6 shows an embodiment of the invention in which the ability of the roller 3 to deliver a uniform layer of grit particles 2 onto a moving web 12 is shown. The roller 3 can have a knurled finish on its peripheral surface. As illustrated, the web 12 is moving from right to left as shown by the arrow 41 but it could equally well move in the other direction. This embodiment uses the basic concept in the invention of the ability to control a uniform layer of grit on a drum without the need for accurately set doctor blades, etc and could be of use in the sandpaper and emery cloth industries to replace existing grit distribution equipment.

The present invention has been described above purely by way of example, and modifications can be made within the spirit of the invention.

We claim:

1. A method of continuously applying grit particles to a continuous web and thereby gritting the web, comprising:

providing a container containing grit particles;

providing a roller which is rotating about a substantially horizontal axis, said roller having a peripheral surface and said peripheral surface defining an ascending part, at least a portion of said ascending part of said peripheral surface being in said container, said ascending part transporting a layer of grit particles up onto an upper part of said peripheral surface;

guiding the web in a path which brings it into a receiving zone for receiving grit particles which said ascending part has transported up onto said upper part of said roller peripheral surface and in which grit particles are transferred to the web, to thereby grit the web; and adding grit particles to the container as grit particles are removed by the web whilst maintaining the top surface of a mass of grit particles adjacent said ascending part of said roller peripheral surface at a controlled level below an uppermost part of the roller, thereby controlling the thickness of said layer on said upper part of said peripheral surface.

2. The method of claim 1, wherein not all of said layer of grit particles is transferred to said web, thereby leaving a portion which is not transferred to said web, said portion being recirculated to adjacent said ascending part of said roller peripheral surface.

3. The method of claim 2, wherein said portion of said layer of grit particles is recirculated under the roller, within said container.

4. The method of claim 1, wherein the web has a thermoplastic surface, the grit particles are heated to a temperature such that in the contact zone, the heated grit particles cause softening or melting of the web surface where the grit particles come in contact with the web surface and on cooling are embedded in and firmly retained by the web.

5. The method of claim 4, wherein in or just downstream of the receiving zone, the web passes through a gap one side of which is formed by a roller which engages the grit particles, the distance of the web from the roller surface being such that the grit particles are pressed into the web.

6. The method of claim 5, wherein the grit particles, after said pressing, project in part from the web.

7. The method of claim 4, wherein the web thermoplastic surface is at or close to ambient temperature on entering said receiving zone.

8. The method of claim 4, wherein the web thermoplastic surface, prior to entering said receiving zone, is heated to a temperature below its softening or melting temperature.

9. The method of claim 1, wherein the grit particles are heated before they are applied to the web.

10. The method of claim 4, wherein the grit particles are heated while on the upper part of the roller peripheral surface, before they reach said receiving zone.

11. The method of claim 10, wherein the grit particles are heated by radiant heaters.

12. The method of claim 4, wherein said receiving zone is at the upper part of the roller peripheral surface and the temperature of the grit particles is sensed using temperature sensing means downstream of the receiving zone and adjacent the descending part of the roller peripheral surface, which sensing means are placed in the path of falling grit particles.

13. The method of claim 1, wherein adhesive is applied to the web before the web reaches the receiving zone, and causes the grit particles to adhere to the web.

14. The method of claim 1, wherein adhesive is applied to the web before the web reaches the receiving zone and causes the grit particles to adhere to the web, the heat of the grit particles assisting in setting or drying the adhesive.

15. The method of claim 1, wherein the roller peripheral surface is not smooth, to thereby provide increased engagement between the roller peripheral surface and the grit particles, for carrying the grit particles up on to said upper part of the roller peripheral surface.

16. The method of claim 15, wherein the roller has a peripheral surface provided with grooves extending parallel to the roller axis.

17. The method of claim 1, wherein a control member is positioned in the container, adjacent said ascending part of the roller peripheral surface and spaced from the roller peripheral surface by a distance substantially greater than the thickness required for the controlled layer of grit particles, the control member maintaining the top surface of the mass of grit particles adjacent said ascending part of the roller peripheral surface at a controlled level below an uppermost part of the roller.

18. The method of claim 17, wherein the control member is vertically movable and there is provided a height adjuster for adjusting the height of the control member, whereby the thickness of the layer of grit particles can be adjusted by adjusting the height of the top surface of the mass of grit particles adjacent said ascending part of the roller peripheral surface by raising or lowering the control member.

19. The method of claim 1, wherein said receiving zone is at the roller peripheral surface upper part.

20. The method of claim 1, wherein said receiving zone is beneath the descending part of the roller peripheral surface so that the grit particles fall off the roller peripheral surface and onto the web.

21. A method of continuously applying grit particles to a continuous web and thereby gritting the web, comprising:

providing a container containing grit particles;

providing a roller which is rotating about a substantially horizontal axis, said roller having a peripheral surface and said peripheral surface defining an ascending part, at least a portion of said ascending part of said peripheral surface being in said container, said ascending part transporting a layer of grit particles up onto an upper part of said peripheral surface;

guiding the net in a path which brings it into a receiving zone at the roller peripheral surface upper part for receiving grit particles which said ascending part has transported up onto said upper part of said roller peripheral surface and in which grit particles are transferred to the web, to thereby grit the web;

providing a control member in the container, adjacent said ascending part of the roller peripheral surface and spaced from the roller peripheral surface by a distance substantially greater than the thickness of said layer of grit particles;

providing a height adjuster for adjusting the height of the control member; and adding grit particles to the container as grit particles are removed by the web whilst maintaining the top surface of a mass of grit particles adjacent said ascending part of said roller peripheral surface at a controlled level below an uppermost part of the roller, thereby controlling the thickness of said layer on said upper part of said peripheral surface, whereby the thickness of said layer of grit particles can be adjusted by adjusting the height of the top surface of the mass of grit particles adjacent the ascending path of the roller peripheral surface by raising or lowering the control member.

22. A method of continuously applying grit particles to a continuous net and thereby gritting the net, comprising:

providing a container containing grit particles;

providing a roller which is rotating about a substantially horizontal axis, said roller having a peripheral surface and said peripheral surface defining an ascending part, at least a portion of said ascending part of said peripheral surface being in said container, said ascending part transporting a layer of grit particles up onto an upper part of said peripheral surface;

guiding the net in a path which brings it into a receiving zone at the roller peripheral surface upper part for receiving grit particles which said ascending part has transported up onto said upper part of said roller peripheral surface and in which grit particles are transferred to the net, to thereby grit the net, not all of said layer of grit particles being transferred to the net, leaving a portion which is not transferred to the net; and recirculating said portion of said layer to adjacent said ascending part of said roller peripheral surface and adding grit particles to the container as grit particles are removed by the web whilst maintaining the top surface of a mass of grit particles adjacent said ascending part of said roller peripheral surface at a controlled level below an uppermost part of the roller, thereby controlling the thickness of said layer on said upper part of said peripheral surface.

23. A method of continuously applying grit particles to a continuous web and thereby gritting the web, comprising:

providing a roller which is rotating about a substantially horizontal axis, said roller having a peripheral surface and said peripheral surface defining an ascending part, at least a portion of said ascending part of said peripheral surface being in a container containing grit particles, said ascending part transporting a layer of the grit particles up onto an upper part of said peripheral surface;

guiding the web in a path which brings it into a contact zone at said upper part of said roller peripheral surface and in which grit particles are picked up by the web; and adding grit particles to the container as grit particles are removed by the web whilst maintaining the top surface of a mass of grit particles adjacent said ascending part of said roller peripheral surface at a controlled level below an uppermost part of the roller, thereby controlling the thickness of said layer on said upper part of said peripheral surface.

24. A web which has been gritted by having grit particles applied thereto by the method of claim 1.

25. Apparatus for continuously applying grit particles to a continuous web, the apparatus comprising:

a container for containing grit particles;

a roller mounted for rotation about a substantially horizontal axis with at least a portion of the ascending part of its peripheral surface in the container;

means for rotating the roller;

means for guiding a web in a path which brings it into a receiving zone for receiving grit particles which have been carried up onto the upper part of the roller peripheral surface whereby in the receiving zone, the web is gritted by grit particles; and means for controlling feed of grit particles to part of the container adjacent the ascending part of the roller peripheral surface such that the top surface of the mass of grit particles adjacent the ascending part of the roller peripheral surface is at a controlled level below the upper part of the roller peripheral surface, to provide in operation a layer of grit particles of a controlled thickness on the upper part of the roller peripheral surface.

26. The apparatus of claim 25, wherein at least the lower part of the roller is in the container, whereby in operation the unused portion of said layer of grit particles is recirculated under the roller, within said container.

27. The apparatus of claim 25, and comprising means for heating the grit particles before they are applied to the web.

28. The apparatus of claim 25, comprising means for heating the grit particles before they are applied to the web, whereby the grit particles cause local softening or melting of the web and are embedded in and firmly retained by the web on cooling.

29. The apparatus of claim 27, wherein the heating means are located for heating the grit particles whilst they are on the upper part of the roller peripheral surface, before they reach said receiving zone.

30. The apparatus of claim 29, wherein the heating means are radiant heaters.

31. The apparatus of claim 25, wherein said receiving zone is at the upper part of the roller peripheral surface, and comprising temperature sensing means downstream of the receiving zone and adjacent the descending part of the roller peripheral surface below the level of the roller axis, for sensing the temperature of grit particles which are carried over by the roller peripheral surface and engage the temperature sensing means.

32. The apparatus of claim 25, and comprising means for applying adhesive to the web before the web reaches said receiving zone.

33. The apparatus of claim 25, wherein the roller peripheral surface is not smooth, to provide increased engagement between the roller peripheral surface and the grit particles, for carrying the grit particles up on to said upper part of the roller peripheral surface.

34. The apparatus of claim 33, wherein the roller peripheral surface is provided with grooves extending parallel to the roller axis.

35. The apparatus of claim 25, wherein there is provided in the container a control member adjacent the ascending side of the roller peripheral surface and spaced from the roller peripheral surface by a distance significantly greater than the thickness required for the controlled layer of grit particles, for maintaining the top surface of the mass of grit particles adjacent the ascending part of the roller peripheral surface at a controlled level below an uppermost part of the roller.

36. The apparatus of claim 35, wherein the control member is vertically moveable and there are means for adjusting the height of the control member, thereby adjusting the level of the surface of the mass of grit particles adjacent the ascending part of the roller peripheral surface.

37. The apparatus of claim 25, wherein said receiving zone is at the roller peripheral surface upper part.

38. The apparatus of claim 25, wherein said receiving zone is beneath the descending part of the roller peripheral surface, whereby the grit particles fall off the roller peripheral surface onto the web.

* * * * *